(12) United States Patent
Stauske et al.

(10) Patent No.: US 6,338,590 B1
(45) Date of Patent: Jan. 15, 2002

(54) SWAGE FITTING MADE OF STEEL AND METHOD FOR ITS PRODUCTION

(75) Inventors: Dieter Stauske, Memmingen; Peter Hoyer, Heimertingen, both of (DE)

(73) Assignee: Pfeifer Holding GmbH & Co., KG, Memmingen (DE)

( * ) Notice: Subject to any disclaimer, the term of this patent is extended or adjusted under 35 U.S.C. 154(b) by 0 days.

(21) Appl. No.: 09/366,786

(22) Filed: Aug. 4, 1999

(30) Foreign Application Priority Data

Aug. 7, 1998 (DE) .......................................... 298 14 074

(51) Int. Cl.[7] .............................................. F16G 11/02
(52) U.S. Cl. ........................ 403/269; 403/278; 403/265; 29/458; 29/515
(58) Field of Search ................................ 403/269, 273, 403/268, 265, 272, 300, 278, 284; 427/406; 428/659; 29/508, 515, 458

(56) References Cited

U.S. PATENT DOCUMENTS

| | | | |
|---|---|---|---|
| 2,446,542 A | * | 8/1948 | MacInnes |
| 2,668,280 A | * | 2/1954 | Dupre |
| 3,716,894 A | * | 2/1973 | Kingston et al. |
| 3,825,356 A | * | 7/1974 | Crook, Jr. .................... 403/122 |
| 4,043,690 A | * | 8/1977 | Browne |
| 4,202,921 A | * | 5/1980 | Enghag ....................... 427/406 |
| 4,390,377 A | * | 6/1983 | Hogg ........................... 427/433 |
| 4,403,884 A | * | 9/1983 | Barnes |
| 4,605,598 A | * | 8/1986 | Thomas et al. .............. 428/659 |
| 5,211,500 A | * | 5/1993 | Takaki et al. ................ 403/269 |
| 5,292,377 A | * | 3/1994 | Izeki et al. .................... 148/23 |
| 5,439,713 A | * | 8/1995 | Yamaoka et al. ............ 427/433 |
| 5,475,973 A | * | 12/1995 | Furukawa et al. ............. 57/232 |
| 5,794,488 A | * | 8/1998 | Yanusko |
| 5,833,277 A | * | 11/1998 | Reinert et al. ............... 285/308 |
| 5,849,408 A | * | 12/1998 | Sugawara |
| 5,872,652 A | * | 2/1999 | Shiono |

FOREIGN PATENT DOCUMENTS

| | | | |
|---|---|---|---|
| DE | 0802347 | * | 10/1997 |
| EP | 0802347 | | 10/1997 |

OTHER PUBLICATIONS

English translation of, EP 0 802 347 A1.*

* cited by examiner

*Primary Examiner*—Lynne H. Browne
*Assistant Examiner*—Tomlyne A Malcolm
(74) *Attorney, Agent, or Firm*—Jacobson Holman, PLLC

(57) ABSTRACT

A fitting is provided with surface corrosion protection which is obtained by firstly hot galvanizing the fitting and subsequently dipping it into a molten, eutectic alloy of zinc and approximately 5% aluminum before swaging it to a wire rope. In order to prevent the wire rope from sliding in the channel, the surface corrosion protection is deposited substantially only on the outer surfaces of the fitting, the channel receiving the wire rope being kept at least substantially free from the corrosion protection.

8 Claims, 1 Drawing Sheet

Fig.1
Fig.2
Fig.3
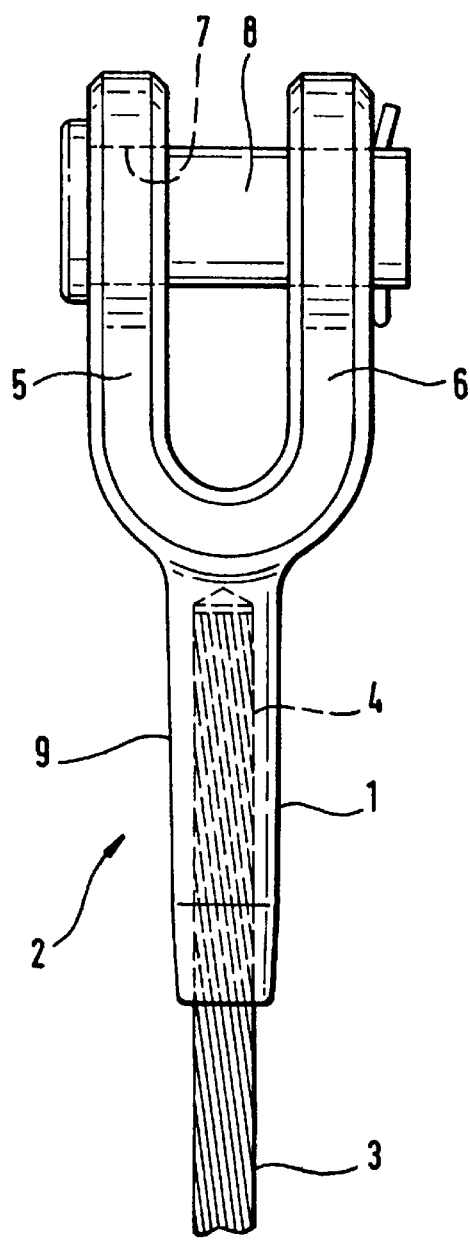
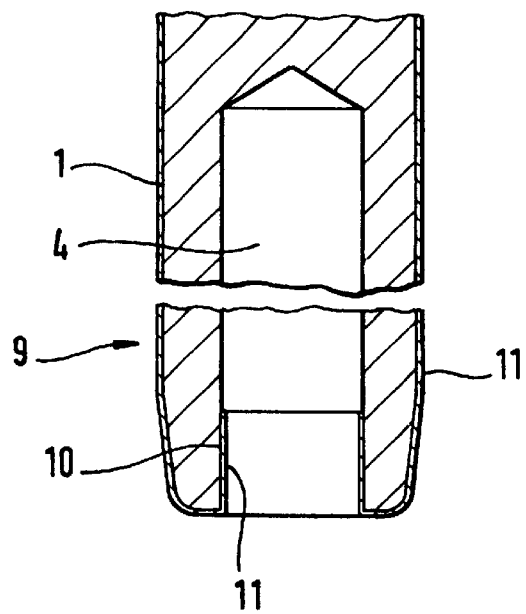
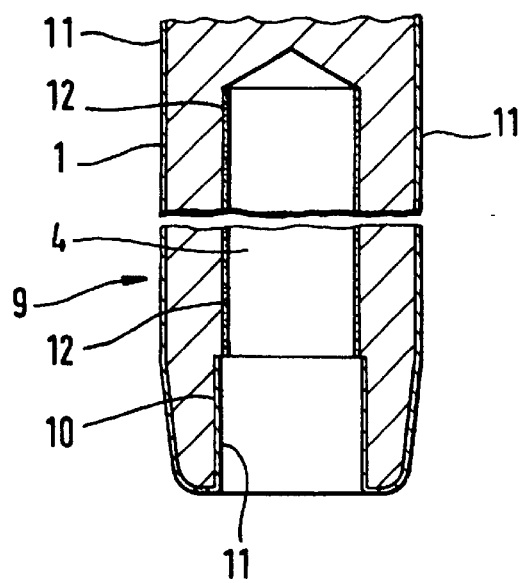

SWAGE FITTING MADE OF STEEL AND METHOD FOR ITS PRODUCTION

BACKGROUND TO THE INVENTION

The invention relates to a fitting made of steel for establishing a connection between the fitting and a wire rope, the fitting having a channel which receives at least one strand of the wire rope and the fitting having a surface corrosion protection which is obtained by firstly hot galvanizing the fitting and subsequently dipping it into a molten, eutectic alloy of zinc and approximately 5% aluminum before swaging it to the wire rope. The invention further relates to a method for producing such a fitting.

A fitting of the above-mentioned generic type is disclosed in EP 0 802 347 A1. This document describes a method for establishing a connection between a fitting consisting of steel, on the one hand, and a wire rope, on the other hand, in which the fitting is firstly hot galvanized and subsequently the fitting is dipped into a molten, eutectic alloy of zinc and approximately 5% aluminum. Lastly the fitting is swaged onto the wire rope, it also being possible for the swaging operation to be effected by rolling, and during this a part of the press fitting which receives the wire rope experiences a reduction in diameter and an increase in length. This known design of a press fitting with a special surface protection has the advantage that the surface protection is preserved even in spite of the deformation, that is to say the reduction in diameter and increase in length, since the surface protection described can follow such deformations and inadequate covering of the surface of the fitting by the surface protection is prevented.

Under unfavourable conditions, however, in particular in the case of high tensile stresses, sliding phenomena of the swaged wire rope may arise. Although as a rule the material of the press fitting also penetrates into the free spaces between the wires or strands of the wire rope during the swaging operation and thus produces not only a fictional-locking, but also a positive-locking connection, the particular properties of the surface protection described cause the wire rope to slide in the channel or in the bore of the press fitting.

BRIEF SUMMARY OF THE INVENTION

It is the object of the invention to develop known fittings in such a way that relative movements between the wire rope and the fitting are excluded even in the case of high loads.

To achieve this object, the invention starts out from a fitting of the type described above at the beginning. According to the invention, it is proposed that the surface corrosion protection is deposited substantially only on the outer surfaces of the fitting, whereas the channel receiving the wire rope is at least largely kept free from this corrosion protection.

DETAILED DESCRIPTION OF THE INVENTION

The channel may, for example, be kept totally free from the corrosion protection, namely by boring the channel only after the hot galvanizing. In a variant of the invention, the fitting, which already has the channel, is hot galvanized in the manner described and dipped into the molten, eutectic alloy described, and subsequently the channel is, however, bored again, reamed or otherwise machined to remove the surface protection in the channel again.

Generally, the corrosion protection in the channel is completely removed during reboring. It is, however, also possible to modify the reboring, reaming or the like in such a way that the layer which produces the corrosion protection is not completely removed, but only greatly diminished in respect of its layer thickness. The tendency to slide can thus be greatly reduced, to the extent that it is insignificant.

In another variant of the invention, there is provision for the channel to have, at the end at which the wire rope emerges from the channel, a tubular part which has the corrosion protection layer. Thus, only the inner channel is rebored. A turning operation may also be necessary in this case. It is better, however, to design the bore with a step having a somewhat larger diameter, in which region the surface protection is then preserved, whereas the channel or the inner part is subjected to an aftertreatment. A fitting of this type can be obtained, in respect of the channel and the tubular part, simply by boring operations.

In another variant, firstly a short bore is made which is hot galvanized in the manner referred to. Subsequently, the receiving bore or the channel for the wire rope is made.

The tubular part which is provided with a surface protection may be about 10 mm long and is not considered in the calculation of the transmittable forces between wire rope and fitting. This makes it possible to achieve a complete closure of the channel during the swaging operation, so that corrosion problems do not occur at all or only to a greatly diminished extent.

The fact that the inner part of the bore or the channel is not coated at all or only to a small extent and thus has no or only a moderate corrosion protection is as a rule of relatively little or only minor importance. The fitting itself is provided with sufficient wall thickness to prevent slight corrosions from impairing the mechanical strength properties.

It is of course possible in the invention also to employ the usual means of filling the hollow spaces in the wire rope, for example using a gel or similar means, which exclude moisture penetration from the outset.

It is also possible to deposit layers of another type to improve the surface protection in the region of the channel receiving the wire rope.

In a development of the invention, provision may be made for the swaging of the wire rope to be effected using sharp-edged, fine-grained material. Such a material is, for example, corundum powder, silica sand or the like. As the fitting is swaged together to establish the connection, the sharp edges of this material pierce the galvanized layer on the wire rope or the wire-rope strands giving rise to a clamping effect, and this is such that even a little galvanizing or a surface protection by dipping into a molten, eutectic alloy of zinc and approximately 5% aluminum can no longer result in a sliding effect. The powder which is introduced provides a direct hold for the wire rope in the press fitting.

BRIEF DESCRIPTION OF THE DRAWINGS

FIG. 1 shows a view of a fitting according to the invention, swaged onto a wire rope.

FIG. 2 shows a longitudinal section of part of the illustration of FIG. 1 on a different scale.

FIG. 3 shows a variant on the illustration of FIG. 2.

DETAILED DESCRIPTION OF PREFERRED EMBODIMENTS

Referring first to FIG. 1, the fitting 2 illustrated in the drawing is designed as a fork fitting. The two fork arms 5 and 6 each have a bore 7 for a bolt 8.

The part 9 of the fitting is designed in the form of a sleeve or channel, and the channel 4 receives a wire rope 3. The part 9 is deformed by a swaging force exerted on it, so that the wire rope 3 is securely held in the channel 4.

The entire outer surface 1 of the fitting is provided with a surface protection of the form described above, and this surface protection extends both over the fork arms 5 and 6 and over the outer surface of the part 9.

The illustrations of FIGS. 2 and 3 show parts of the fitting prior to swaging. The channel 4 is substantially without surface protection. It is advantageous if the tubular part 10 has a surface protection.

In the case of the embodiment according to FIG. 2, the diameter of the part 10 is substantially equal to the diameter of the channel 4. In the embodiment according to FIG. 3, in contrast, the part 10 is designed with a somewhat larger diameter, so that the channel 4, which fixes the wire rope in position, can be obtained by simple boring. The inner surface of the channel 4 may have a coating 12 made of corundum powder or silica sand.

The coating of the fitting 2, which produces the corrosion protection described, is for example about 100 to 200 $\mu$m (i.e. 0.1 to 0.2 mm thick). It is indicated in FIGS. 2 and 3 as a thin layer 11.

Although the invention has been described in terms of specific embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A swage fitting of steel for establishing a connection between the fitting and a wire rope, the fitting comprising a channel for receiving at least one strand of the wire rope and having surface corrosion protection obtained by firstly hot galvanizing the fitting and subsequently dipping the fitting into a molten, eutectic alloy of zinc and approximately 5% aluminum before swaging the fitting, the surface corrosion protection being deposited substantially only on outer surfaces of the fitting, the channel for receiving the wire rope being kept at least substantially free from the corrosion protection.

2. The swage fitting according to claim 1, wherein the channel has, at an end at which the wire rope emerges from the channel, an inner surface of which has the surface corrosion protection.

3. The swage fitting according to claim 2, wherein the end of the channel has a larger internal diameter than a remainder of the channel.

4. The swage fitting according to claim 1, wherein the channel has a coating of sharp-edged, fine-grained material.

5. The swage fitting according to claim 4, wherein the sharp-edged, fine-grained material is corundum powder.

6. The swage fitting according to claim 4, wherein the sharp-edged, fine-grained material is silica sand.

7. Method for producing a fitting of steel for connection to a wire rope, the fitting having a channel for receiving at least one strand of a wire rope, said method comprising:

obtaining surface corrosion protection of the fitting by firstly hot galvanizing the fitting and subsequently dipping the fitting into a molten, eutectic alloy of zinc and approximately 5% aluminum before swaging the fitting to the wire rope, firstly depositing the surface corrosion protection substantially on all the surfaces of the fitting and subsequently removing at least substantially all of the surface corrosion protection in the channel by machining.

8. Method for producing a fitting of steel for connection to a wire rope, the fitting having a channel for receiving at least one strand of the wire rope, said method comprising:

obtaining surface corrosion protection of the fitting by firstly hot galvanizing the fitting and subsequently dipping the fitting into a molten, eutectic alloy of zinc and approximately 5% aluminum before swaging the fitting to the wire rope, forming the channel for receiving the wire rope in the fitting by machining after the surface protection has been deposited on the fitting.

* * * * *